United States Patent [19]

Stein

[11] Patent Number: 4,678,197
[45] Date of Patent: Jul. 7, 1987

[54] ARRANGEMENT FOR INFLUENCING THE KEEPING OF A DRIVING DIRECTION BY A MOTOR VEHICLE

[75] Inventor: Willy Stein, Kindelbergweg 1, 7253 Renningen, Fed. Rep. of Germany

[73] Assignee: Willy Stein, Renningen, Fed. Rep. of Germany

[21] Appl. No.: 887,263

[22] Filed: Jul. 21, 1986

[51] Int. Cl.⁴ ............................................. B62D 63/00
[52] U.S. Cl. .................................... 280/80 R; 180/236; 280/81 A; 280/91; 280/661; 301/5 R
[58] Field of Search ................... 280/80 R, 81 A, 771, 280/91, 93, 96.1, 660, 661, 103; 180/234, 236; 301/5 R

[56] References Cited

U.S. PATENT DOCUMENTS

| | | | |
|---|---|---|---|
| 2,583,858 | 1/1952 | Kostolecki | 280/80 R |
| 3,276,788 | 10/1966 | Sackler et al. | 280/80 R |
| 4,335,899 | 6/1982 | Hiscock | 280/259 |
| 4,449,727 | 5/1984 | Roos | 280/91 |

FOREIGN PATENT DOCUMENTS 866008 2/1953 Fed. Rep. of Germany .

OTHER PUBLICATIONS

Auto Motor and Sport, vol. 17, dated 8/21/85, pp. 131-132.

August Bilstein brochure, "Garagen-Abschlepp-und Werkstatt-Gerate," undated.

*Primary Examiner*—John J. Love
*Assistant Examiner*—Kenneth R. Rice
*Attorney, Agent, or Firm*—Erwin S. Teltscher

[57] ABSTRACT

An arrangement for influencing the keeping of a driving direction by a motor vehicle, which has at least one non-driven wheel support body which is mounted on a wheel suspension for rotation about an axis, in such a manner as to be able to conduct driver education and/or motor vehicle testing while operating in a border region between stable and unstable driving behavior at relatively low speeds comprises a holding component which is rigidly connected to the wheel support body, and a caster wheel which is mounted on the holding component for rotation about its rotational axis and also for turning about an additional axis which is substantially normal to the axis of the wheel support body and to the rotational axis of the wheel. A connecting device prevents the rotation of the wheel support body about its axis and is connected to a non-rotatable part of the wheel suspension. In this manner, lateral guiding forces normally holding the non-driven regular wheels of the motor vehicle are eliminated or at least significantly reduced, in that the caster wheel turns about the additional axis in an almost instantaneous response to lateral disturbance forces acting on the vehicle and readjusts its position accordingly to simulate vehicle behavior during skidding even at low driving speeds.

9 Claims, 6 Drawing Figures

ARRANGEMENT FOR INFLUENCING THE KEEPING OF A DRIVING DIRECTION BY A MOTOR VEHICLE

BACKGROUND OF THE INVENTION

The present invention relates to motor vehicles in general, and more particularly to an arrangement for influencing the keeping of the driving direction by a motor vehicle which has at least one non-driven wheel.

In the field of manufacturing motor vehicles, it is customary to design the motor vehicle in such a manner that it follows the steering movements of the driver who desires to maintain the motor vehicle on a desired course and that the handling of the motor vehicle is relatively easy for the driver. However, disturbing forces and moments act on the motor vehicle during the operation thereof. Such disturbing influences are caused by driving through curves, braking, side wind and varying surface qualities of the roadway, and they all tend to deviate the motor vehicle from the desired driving direction or course. It is desired to keep the deviating movements which are caused by the aforementioned disturbing forces and moments at a level which is as low as possible and which can be easily corrected within the reaction time of the driver. Nevertheless, during the operation of the motor vehicle at critical operating conditions, that is, when the action of the driver causes the motor vehicle to leave the limiting range of the lateral guiding forces caused by frictional engagement of the vehicle tires with the roadway, either in that the driver exceeds the handling capabilities of the motor vehicle, or because the motor vehicle travels on a smooth or icy roadway, the motor vehicle experiences an unstable driving condition which, in most instances, is manifested by swerving of the rear end of the motor vehicle. In order to bring the motor vehicle back into the stable driving range, the driver must then react very quickly by both turning the steering wheel and actuating the gas pedal in the correct manner. The recognition of the signals which are triggered by an unstable driving condition and the correct responses to such signals can be learned only by extensive driver training under realistic driving conditions.

The driver training of this kind has heretofore been mostly conducted on driving surfaces which were made smooth by applying grease, soap or other chemical slippage-enhancing substances. The application of such slippage-enhancing substances on the roadways or other driving surfaces, and their subsequent removal, are very time-consuming and expensive, and in most instances results in environmental pollution. Furthermore, when driver training is being conducted for this purpose on a more or less permanent basis, there have also been already used synthetic plastic material coatings with a smooth upper surface on the driving surfaces of such areas. However, such coatings are very expensive and, for all intents and purposes, make the affected area for any use other than for teaching the vehicle skid counteracting techniques useless.

SUMMARY OF THE INVENTION

Accordingly, it is a general object of the present invention to avoid the disadvantages of the prior art.

More particularly, it is an object of the present invention to provide an arrangement for influencing the driving behavior, especially the lateral guidance, of a motor vehicle, which arrangement does not possess the drawbacks of the known arrangements of this type.

It is yet another object of the present invention to design the above arrangement in such a manner as to provide, at relatively low speeds, a realistic simulation of the operation of the vehicle in the critical or unstable driving range.

Still another object of the present invention is to devise an arrangement of the type here under consideration which would render it possible for the driver to experience the behavior of the vehicle under skidding driving conditions and to learn the reaction of the vehicle both to improper and proper driver actions, at relatively safe speeds and without having to treat the driving surface beforehand so as to make it slippery.

A concomitant object of the present invention is so to construct the arrangement of the above type as to be relatively simple in construction, inexpensive to manufacture, easy to use, and yet reliable in operation.

In keeping with these objects and others which will become apparent hereafter, one feature of the present invention resides in an arrangement for influencing the keeping of a driving direction by a motor vehicle having at least one non-driven wheel support body which is mounted on a wheel suspension for rotation about an axis, this arrangement comprising a holding component rigidly connected to the wheel support body; a caster including a wheel centered on a rotational axis, and means for mounting the wheel on the holding component for rotation about the rotational axis thereof and also for turning about an additional axis which is substantially normal to the axis of the wheel support body and to the rotational axis of the wheel; and means for preventing the rotation of the wheel support body about the axis thereof, the preventing means being connected to a non-rotatable part of the wheel suspension.

Advantageously, the mounting means for the wheel is so constructed as to permit adjustment cf the distance between the wheel and the holding component. It is also advantageous when the mounting means for the wheel is so constructed as to permit adjustment of the degree of trailing of the wheel.

According to an advantageous aspect of the present invention, the preventing means is operative for holding the holding component in such a position that the additional axis extends at most at a slight forward inclination with respect to an upward direction that is parallel to a vertical axis of the vehicle. The arrangement of the present invention advantageously further comprises means for selectively limiting the extent of turning of the caster about the additional axis. The mounting means for the caster includes a bearing, and it is advantageous when there is further provided means for adjusting the friction resistance to the turning about the additional axis which is encountered at the region of the bearing.

When the arrangement of the present invention is used with a vehicle suspension including an elongate swinging arm having a hollow free end, it is advantageous when the preventing means includes a substantially cylindrical sliding shoe received in the hollow free end of the swinging arm for longitudinal sliding displacement therein and including a substantially transverse web situated externally of the swinging arm, and a spherical joint arranged at the web and connecting the latter to the remainder of the preventing means. The remainder of the preventing means advantageously includes a cantilevered member secured to the holding component and extending eccentrically of the holding component beyond the latter, an elongate rod having two longitudinally spaced ends one of which is connected to the spherical joint, the rod extending substantially parallel to the additional axis, and means for connecting the other end of the rod to the cantilevered member. It is particularly advantageous when the connecting means is constructed in such a manner as to permit elevational adjustment of the position of the rod relative to the cantilevered member.

The present invention is based on the recognition of the fact that the lateral guidance forces of a non-driven (rear) axle of a motor vehicle can be reduced or eliminated altogether by replacing the laterally acting adhesion and sliding friction resistance of the regular vehicle wheel by a rolling friction resistance for the purpose of driver education or training and/or vehicle testing. This is achieved in accordance with the present invention in that the non-driven (rear) wheels of the motor vehicle are constituted or replaced, in each instance, by at least one caster which may include either a disc-shaped wheel or roller, or a spherical roller, and which has the ability to assume, in dependence on and in response to the disturbing forces acting on the vehicle, a position which is more or less transverse with respect to the front-to-rear direction of the vehicle, so that the (rear) end of the vehicle which is supported on the caster or casters begins to drift, sway or swerve even at low driving speeds, or the vehicle commences to rotate about its vertical axis, when the proper remedying actions are not taken with the steering wheel and the gas pedal of the motor vehicle.

For the professional driver training or education, and for driving experiments and tests during the motor vehicle testing, it is proposed in accordance with a currently preferred concept of the present invention to mount the casters directly on the motor vehicle wheel suspension for the non-driven wheel, instead of the respective regular (rear) wheel. As a result of this, it is possible to use relatively large caster wheels or rollers, which are capable of overcoming driving surface unevennesses of even a considerable magnitude. Moreover, as a result of the elevationally adjustable mounting of the caster rollers or wheels on the wheel suspension, it is possible to adjust the position of the instantaneous center of the rear axle of the motor vehicle to any desired elevation, and to orient the additional axis of the caster as desired either exactly vertically or at a slight inclination in the forward direction, in order to influence the return forces acting on the caster in this manner.

According to another facet of the present invention, the degree of trailing of the respective caster and/or the frictional resistance at the region of the caster bearing, can be adjusted, or the extent of turning of the caster about the additional axis can be limited, by resorting to appropriate measures, in order to adapt the driving behavior or operational response of the motor vehicle to the driving experience or expertise of the particular driver.

The arrangements of the present invention render it possible for every car driver with an average degree of skill to learn in only several hours of driving the vehicle equipped in accordance with the present invention how to correctly control his or her own vehicle even under unstable driving conditions. The training exercises are not dangerous, inasmuch as they can be conducted at low driving speeds.

BRIEF DESCRIPTION OF THE DRAWING

The present invention will be described below in more detail with reference to the accompanying drawing in which.

DETAILED DESCRIPTION OF THE PREFERRED EMBODIMENT

Figure 1:
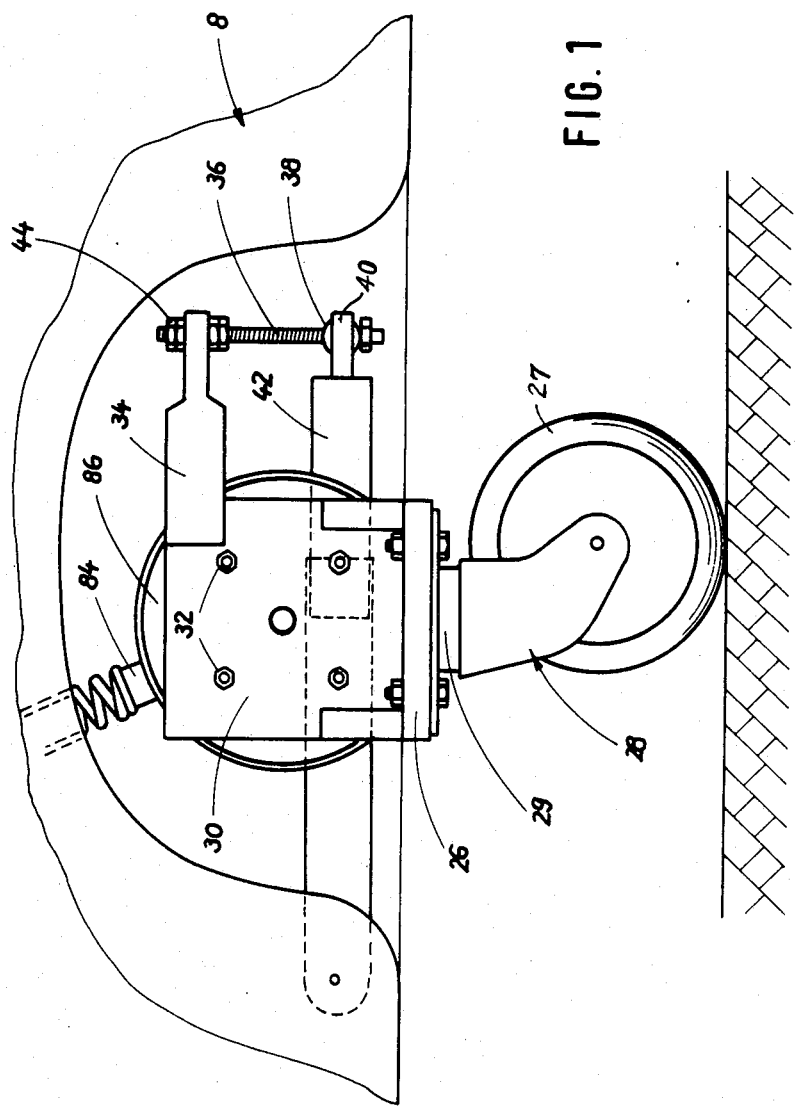
FIG. 1 is a side elevational view of a mounting carriage constructed in accordance with the present invention and mounted on the wheel suspension of a rear wheel of a motor vehicle

Referring now to the drawing in detail, it may be seen that it depicts arrangements constructed in accordance with the present invention and operative for reducing or eliminating lateral guidance forces at the non-driven wheels, especially rear wheels, of a motor vehicle. These arrangements are particularly suited for driver training or education and/or for motor vehicle testing purposes.

Figure 2:
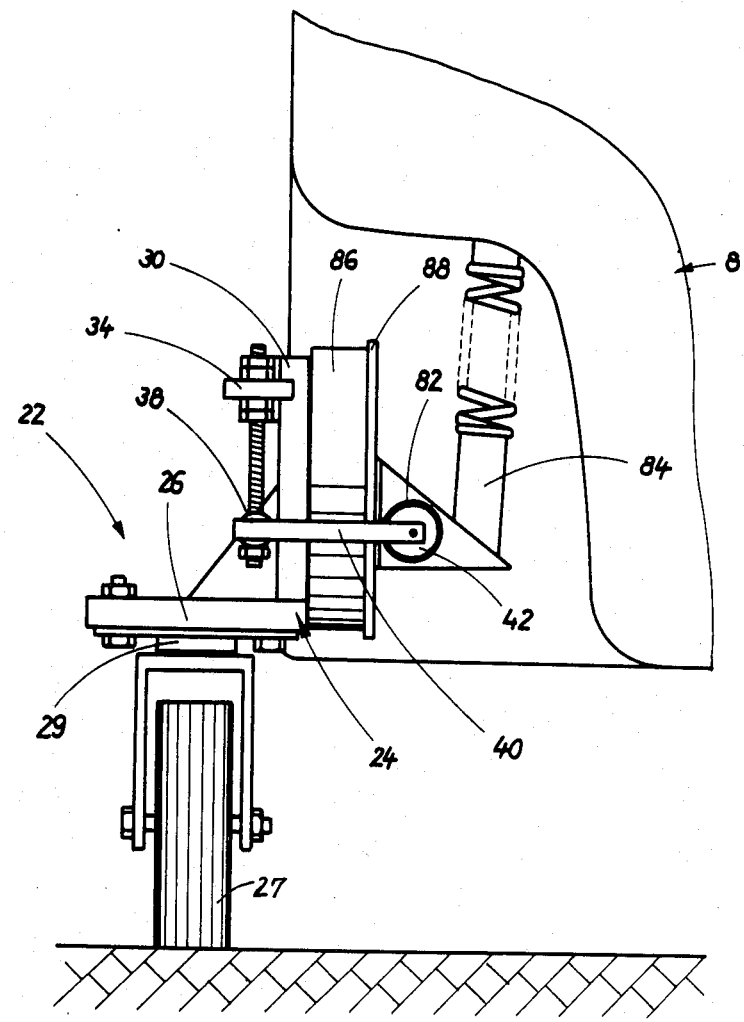
FIG. 2 is a rear elevational view of the mounting carriage of FIG. 1.
Figure 3:
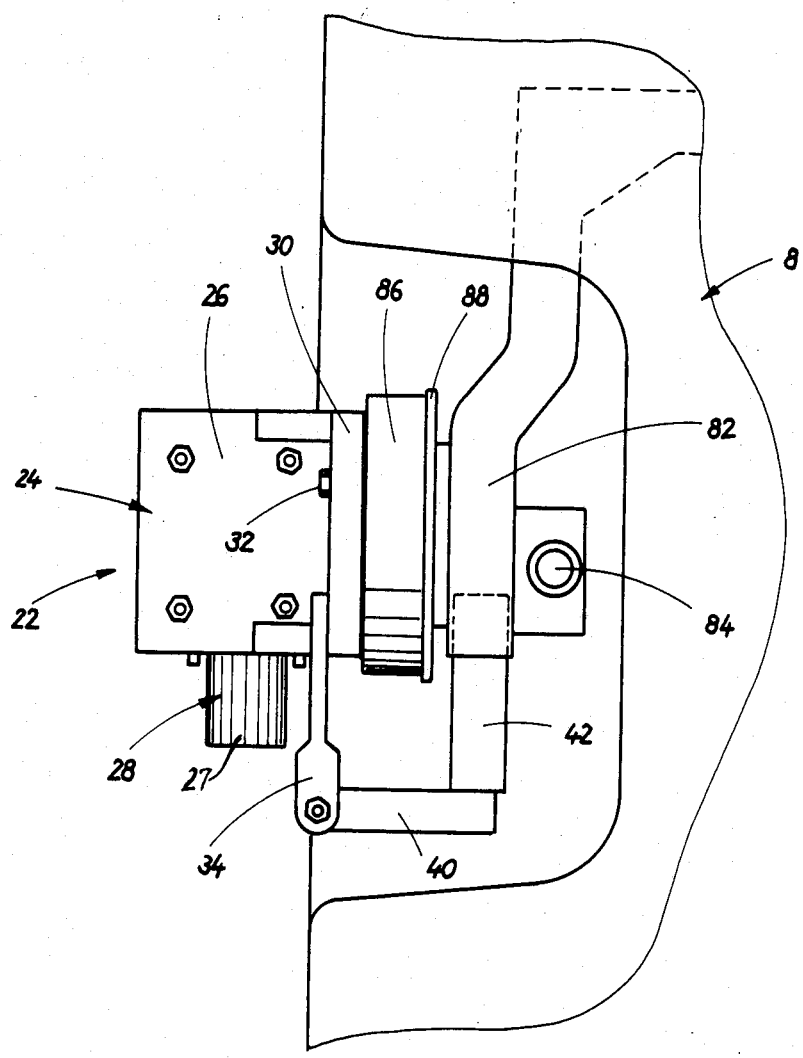
FIG. 3 is a top plan view of the mounting carriage of FIGS. 1 and 2.
Figure 4:
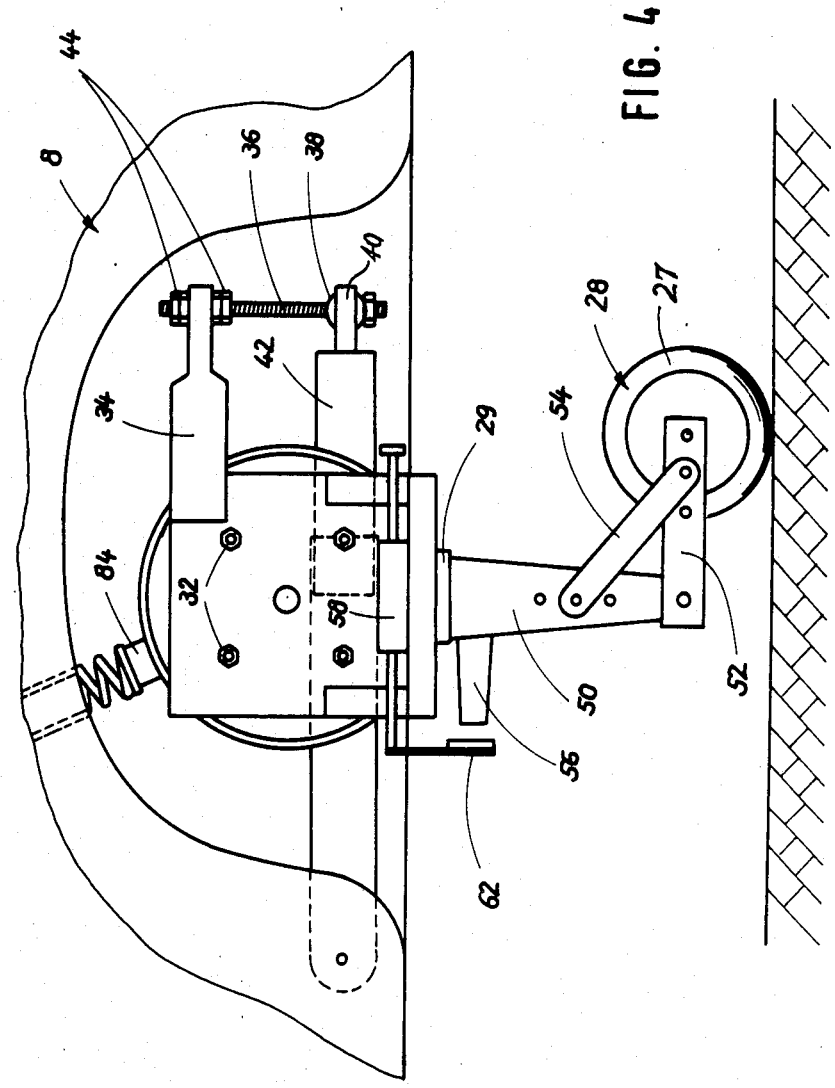
FIG. 4 is a view similar to FIG. 1 but showing a somewhat modified construction of the mounting carriage of the present invention.
Figure 5:
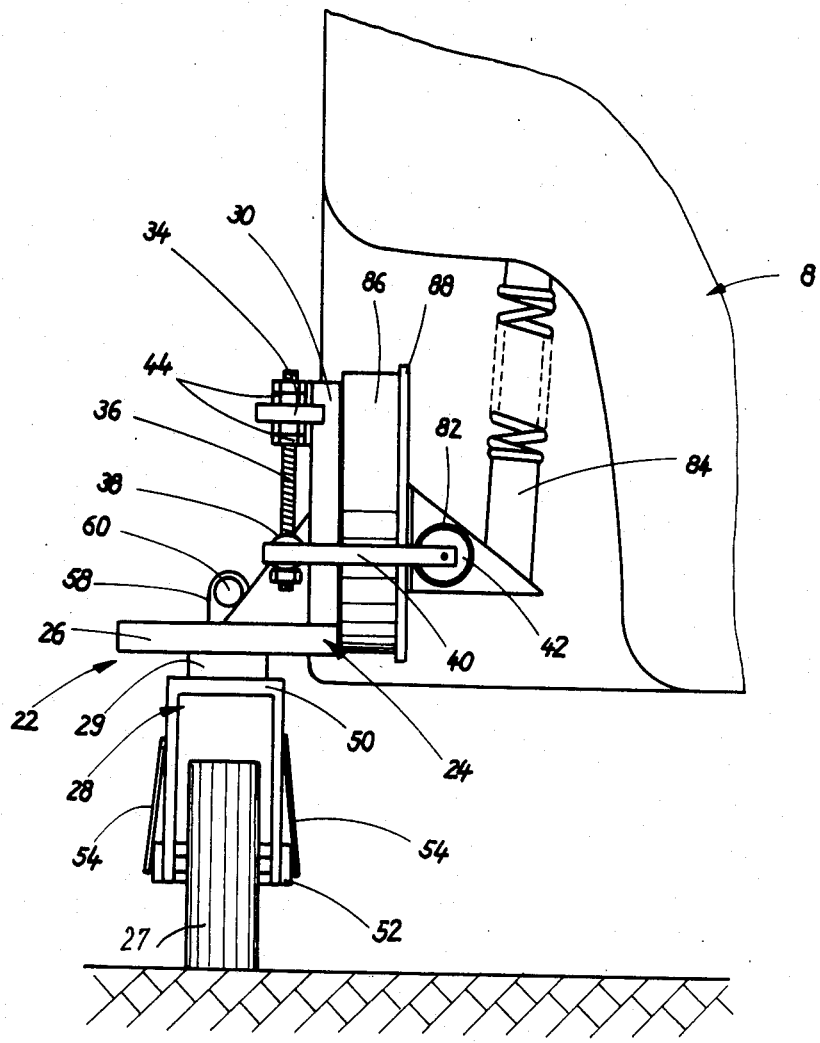
FIG. 5 is a rear elevational view of the mounting carriage of FIG. 4.
Figure 6:
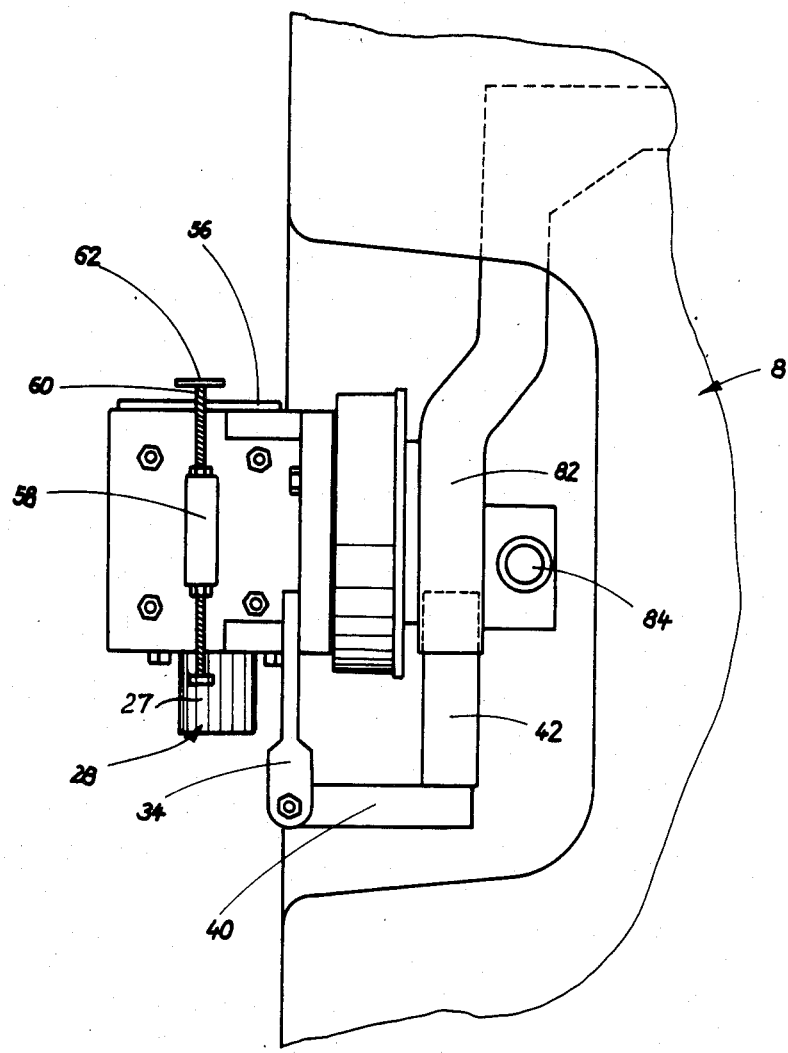
FIG. 6 is a top plan view of the mounting carriage of FIGS. 4 and 5.

These arrangements, which are illustrated in detail in FIGS. 1 to 3, on the one hand, and in FIGS. 4 to 6, on the other hand, and which are to be connected directly to the wheel suspensions of the non-driven (rear) wheels of the motor vehicle, will be referred to herein as "mounting carriages" for the sake of simplicity and will be identified by the reference numeral 22 in each instance.

As can be ascertained particularly from a comparison of FIGS. 2 and 3, and 5 and 6, with one another, there is provided, in the illustrated constructions, an individual wheel suspension for the respective rear wheel, this suspension including a swinging arm 82 and a spring leg 84. Herein, the rotatable wheel support body (brake drum or disc 86) is rotatably supported on an anchor plate 88 which is rigidly connected with the swinging arm 82.

Each of the mounting carriages 22 includes an angular element 24 which is shown to consist of two plates 26 and 30 which are connected to one another, such as by welding and extend substantially at a right angle with respect to one another. Of these plates 26 and 30, the plate or arm 26 carries a roller or caster 28, while the other plate or arm 30 serves as a flange which is juxtaposed with the wheel support plate 86 and is secured thereto by a plurality of (as shown in FIGS. 1 and 4, four) wheel nuts 86 or wheel screws, depending on the construction of the wheel support plate 86.

On the arm 30 of the angular element 24, there is further provided a cantilevered member 34 which is arranged eccentrically of and projects substantially horizontally beyond the arm 30 in the mounted condition of the angular element 24. A substantially vertical threaded rod 36 is secured by respective adjustment and jam nuts 44 to the free end portion of the cantilevered member 34, and its end which is downwardly spaced from the cantilevered member 34 is connected, by means of a ball joint 38, to a substantially horizontal web member 40. The web member 40, in turn, is connected to or unitary with a sliding shoe 42 which is introducible into and, during the use of the mounting carriage 22, received in a rearwardly open cylindrical hollow space of the swinging arm 82. The sliding shoe 42, which is received in the interior of the swinging arm 82 for movement longitudinally thereof is radially supported by the swinging arm 82 and, in this manner, it forms a rotation prevention arrangement for the mounting support 22 which is mounted on the rotatable wheel support body 86.

By means of the adjustable and jam nuts 44 which are mounted on the threaded rod 36, it is possible to adjust the position of the mounting support 22 on the wheel suspension in such a manner that, at a given loading of the motor vehicle 8, the arm 26 of the angular element 24, and thus also a bearing ring 29 which turnably supports the caster 28 on the arm 26, is oriented along a plane which is substantially horizontal or is slightly inclined in the forward direction of the motor vehicle 8. When the slight forward inclination of the aforementioned plane is chosen, there is obtained an improved tendency of the roller or caster 28 to return toward coincidence with the forward driving direction of the vehicle. Furthermore, the caster 28 is so constructed as to have a degree of trailing which is either predetermined, as shown in FIGS. 1 to 3, or adjustable as indicated in FIGS. 4 to 6. This degree of trailing assures an almost instantaneous alignment of the caster 28 in the direction of the force resultant acting at the rear of the motor vehicle 8. In this manner, lateral guidance forces at the region of the rear axle of the vehicle 8 are largely eliminated.

By using pre-tensioned conical roller bearings and/or friction discs in the bearing 29, there can also be obtained a predetermined resistance to turning, this resistance then providing for a certain degree of lateral guidance.

As illustrated in FIGS. 4 to 6 of the drawing, the caster 28 includes a wheel 27 which is mounted for rotation on an angular bifurcated bracket that includes two parts 50 and 52 that are articulately connected to one another and the angular position of which relative to one another can be adjusted and maintained by means of adjustable transverse braces or links 54. In this manner, both the elevation of the mounting support 22 above ground and thus the instantaneous center of the motor vehicle 8, and the degree of trailing of the caster 28, can be varied.

FIGS. 4 to 6 of the drawing further show an arrangement for limiting the degree of steering deflection of the caster 28. This arrangement includes a limiting projection 56 which extends substantially horizontally from the part 50 of the aforementioned bifurcated bracket, a threaded spindle 60 which is mounted in and engages a threaded sleeve 58 that is secured to the angular element 24, and an abutment plate 62 which is mounted on and extends substantially perpendicularly with respect to the threaded spindle 60 and which constitutes an abutment for the limiting projection 56 in its downwardly extending position. The range of the angular displacement of the caster 28 can be adjusted by turning the threaded spindle 60 in the threaded sleeve 58. It is, therefore, also possible by using this arrangement to achieve a rigid alignment of the caster 28 in the forward driving direction of the motor vehicle 8.

While the present invention has been described and illustrated herein as embodied in a specific construction of an arrangement for influencing the driving behavior or a motor vehicle, it is not limited to the details of this particular construction, since various modifications and structural changes are possible and contemplated by the present invention. Thus, the scope of the present invention will be determined exclusively by the appended claims.

What is claimed is:

1. An arrangement for influencing the keeping of a driving direction by a motor vehicle having at least one non-driven wheel support body which is mounted on a wheel suspension for rotation about an axis, comprising
   a holding component rigidly connected to the wheel support body;
   a caster including a wheel centered on a rotational axis, and means for mounting said wheel on said holding component for rotation about said rotational axis thereof and also for turning about an additional axis which is substantially normal to the axis of the wheel support body and to said rotational axis of said wheel; and
   means for preventing the rotation of the wheel support body about the axis thereof, said preventing means being connected to a non-rotatable part of the wheel suspension.

2. The arrangement as defined in claim 1, wherein said mounting means for said wheel is so constructed as to permit adjustment of the distance between said wheel and said holding component.

3. The arrangement as defined in claim 1, wherein said mounting means for said wheel is so constructed as to permit adjustment of the degree of trailing of said wheel.

4. The arrangement as defined in claim 1, wherein said preventing means is operative for holding said holding component in such a position that said additional axis extends at most at a slight forward inclination with respect to an upward direction that is parallel to a vertical axis of the vehicle.

5. The arrangement as defined in claim 1, and further comprising means for selectively limiting the extent of turning of said caster about said additional axis.

6. The arrangement as defined in claim 1, wherein said mounting means includes a bearing; and further comprising means for adjusting the friction resistance to the turning about said additional axis which is encountered at the region of said bearing.

7. The arrangement as defined in claim 1 for use with a vehicle suspension including an elongate swinging arm having a hollow free end, wherein said preventing means includes a substantially cylindrical sliding shoe received in the hollow free end of the swinging arm for longitudinal sliding displacement therein and including a substantially transverse web situated externally of the swinging arm, and a spherical joint arranged at said web and connecting the latter to the remainder of said preventing means.

8. The arrangement as defined in claim 7, wherein said remainder of said preventing means includes a cantilevered member secured to said holding component and extending eccentrically of said holding component beyond the latter, an elongate rod having two longitudinally spaced ends one of which is connected to said spherical joint, said rod extending substantially parallel to said additional axis, and means for connecting the other end of said rod to said cantilevered member.

9. The arrangement as defined in claim 8, wherein said connecting means is constructed in such a manner as to permit elevational adjustment of the position of said rod relative to said cantilevered member.

* * * * *

UNITED STATES PATENT OFFICE
CERTIFICATE OF CORRECTION

Patent No. 4,678,197  Dated July 7, 1987

Inventor(s) Willy Stein

It is certified that error appears in the above-identified patent and that said Letters Patent are hereby corrected as shown below:

Title page:

The address and name of Assignee should be changed to --Computerisierte Warenhandels und Vermittlungsgesellschaft mbH, Fed. Rep. of Germany--.

Signed and Sealed this

Fifth Day of April, 1988

*Attest:*

DONALD J. QUIGG

*Attesting Officer*  *Commissioner of Patents and Trademarks*